United States Patent [19]

Tabei

[11] Patent Number: 4,763,198

[45] Date of Patent: Aug. 9, 1988

[54] INTERLINE TRANSFER CCD SENSOR WITH A CID READOUT STAGE

[75] Inventor: Masatoshi Tabei, Kanagawa, Japan

[73] Assignee: Fuji Photo Film Co., Ltd., Kanagawa, Japan

[21] Appl. No.: 33,376

[22] Filed: Apr. 2, 1987

[30] Foreign Application Priority Data

| Apr. 2, 1986 [JP] | Japan | 61-74153 |
| Apr. 2, 1986 [JP] | Japan | 61-88256 |
| Apr. 2, 1986 [JP] | Japan | 61-89506 |

[51] Int. Cl.⁴ ............................................ H04N 3/14
[52] U.S. Cl. ........................ 358/213.26; 358/213.29; 357/24
[58] Field of Search ............ 358/213.31, 213.29, 358/213.26, 213.23; 357/24 LR, 30 H

[56] References Cited

U.S. PATENT DOCUMENTS

| 4,064,533 | 12/1977 | Lampe et al. | 358/213.29 |
| 4,489,423 | 12/1984 | Suzuki | 357/24 LR |
| 4,539,597 | 9/1985 | Kinoshita et al. | 357/24 LR |
| 4,577,233 | 3/1986 | Kimata | 358/213.31 |
| 4,598,320 | 7/1986 | Arques | 358/213.31 |
| 4,611,234 | 9/1986 | Berger et al. | 358/213.31 |
| 4,617,595 | 10/1986 | Berger | 358/213.31 |
| 4,684,993 | 8/1987 | Berger et al. | 358/213.31 |
| 4,686,573 | 8/1987 | Murayama et al. | 358/213.19 |
| 4,707,744 | 11/1987 | Kimata et al. | 358/213.31 |

*Primary Examiner*—Jin F. Ng
*Assistant Examiner*—Stephen Brinich
*Attorney, Agent, or Firm*—Sughrue, Mion, Zinn, Macpeak, and Seas

[57] ABSTRACT

An image sensor in which charge is transferred from an array of photosensing elements to a plurality of vertical CCDs arranged between columns of the photosensing element. The CCD channels are all gated near their ends by a first MOS electrode. Thereafter, separately controlled second MOS electrode inject the current in the channels into the substrate, from which it can be read. Preferably, the first MOS electrode has a tooth shape with the second MOS electrode in a staggered arrangement near the tooth side to reduce cross-channel interference. Also preferably, the substrate around the second electrodes is isolated.

6 Claims, 3 Drawing Sheets

INTERLINE TRANSFER CCD SENSOR WITH A CID READOUT STAGE

BACKGROUND OF THE INVENTION

1. Field of the Invention

The invention relates generally to image sensors. In particular, it relates to a method of reading imaging data from the sensor.

2. Background of the Invention

There has been known an image sensor in which transfer CCD's are arranged in the row and column directions and photoelectrically converted signal charges are sequentially transferred as an output first in the column direction and then in the row direction.

In such an image sensor constituted as described above, an increase in the number of picture elements in the horizontal direction for achieving high resolution of picture elements has resulted in the phenomenon that reading of charges becomes impossible because of the limit in high frequency driving. Therefore, it has been attempted, for example, to provide a dual channel CCD and data can be read from assigned ones of the charges to be transferred horizontally.

However, this method has a disadvantage that the assignment of charges is complicated. Accordingly, a device which uses CID (charge injection device) for reading of charges in the horizontal direction has been considered in place of such dual channel CCD.

As is well known, a CID is composed of a plurality of MOS electrode pairs arranged in the form of a matrix. Image charges are proportional to the amount of incident light and are accumulated in an inversion layer under the selected electrode. Charges of only the designated electrode pairs are injected into a substrate for reading.

However, since the photosensing part and charge injection part of a conventional CID are formed in the same manner and the element surface is covered with polysilicon, its sensitivity is not so good due to the transmissivity of light. In particular, deterioration in sensitivity to the blue part of the spectrum has limited the total sensitivity of the device.

In addition, the time of about several tens to hundreds of microseconds has been required for the recoupling process in which charges are injected into a substrate. As a result, charges generated in adjacent areas enter the nearby picture element, often generating adjacent crosstalk.

Moreover, since the CID extracts the signal from the entire part of substrate on the occasion of injecting charges into the substrate, the signal-to-noise S/N ratio has been lowered due to the noise of entire part of substrate, for example, incoming noise or clock noise, etc.

SUMMARY OF THE INVENTION

The present invention has been proposed considering disadvantages of such prior art.

It is accordingly a first object of the present invention to provide an image sensor which can improve sensitivity and also increases horizontal resolution, thereby resulting in high integration density.

It is another object of the present invention to provide an image sensor which improves horizontal resolution by preventing generation of crosstalk, thereby resulting in good color reproducibility.

It is a further object of the present invention to provide an image sensor which realizes reading of charges from high density picture elements and also improves the S/N ratio.

DETAILED DESCRIPTION OF THE PREFERRED EMBODIMENTS

The first embodiment of the image sensor of the present invention will be explained in greater detail with reference to the accompanying drawings.

Figure 1A:
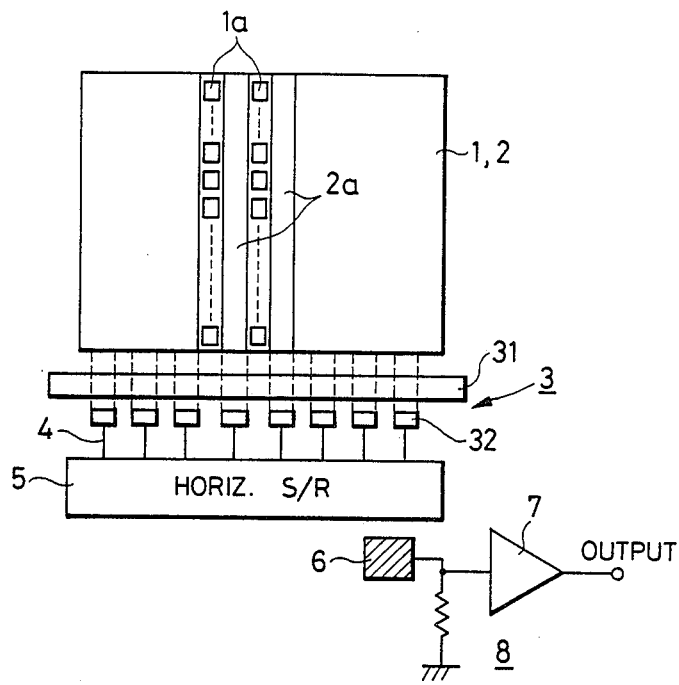
FIGS. 1A and 1B are pictorial presentation for explaining an image sensor, based on the first and second embodiments of the present invention respectively.

The first embodiment illustrated in FIG. 1A comprises a photosensing part 1 and a vertical transfer part 2 formed by the ordinary interline CCD (ILCCD) and is indicated by the simplified block diagram. This ILCCD is composed of the photosensing part 1 in which a plurality of photosensing elements 1a are arranged along the column direction. The ILCCD also includes the vertical transfer part in which vertical transfer CCDs 2a are alternately provided between the columns of the photosensing elements 1a. The vertical transfer CCDs 2a receive the image charges from the separate photosensing elements 1a in parallel and shifts these charges out serially in a semiconducting signal channel. The vertical transfer CCDs 2a are driven, for example, in four phases.

As the output end of the vertical CCDs 2a, a MOS electrode pair 3 is arranged extending along the horizontal direction. The MOS electrode pair 3 is composed of a first electrode 31 provided in common to the picture element column and a plurality of second electrodes 32 provided independently corresponding to each picture element column. The MOS electrode pair 3 is composed of a polysilicon electrode 31 which is laid across all of the semiconducting signal channels of the picture element columns and a plurality of polysilicon electrode 32, each lying across one of the semiconducting signal channel and which is independently controlled for each picture element column. The electrode 32 is further connected wiih and controlled by a horizontal shift register 5 through aluminum wires 4.

Moreover, a read circuit 8 including an amplifier 7 is provided to a substrate 6 underlying the electrodes 32.

Figure 2A:
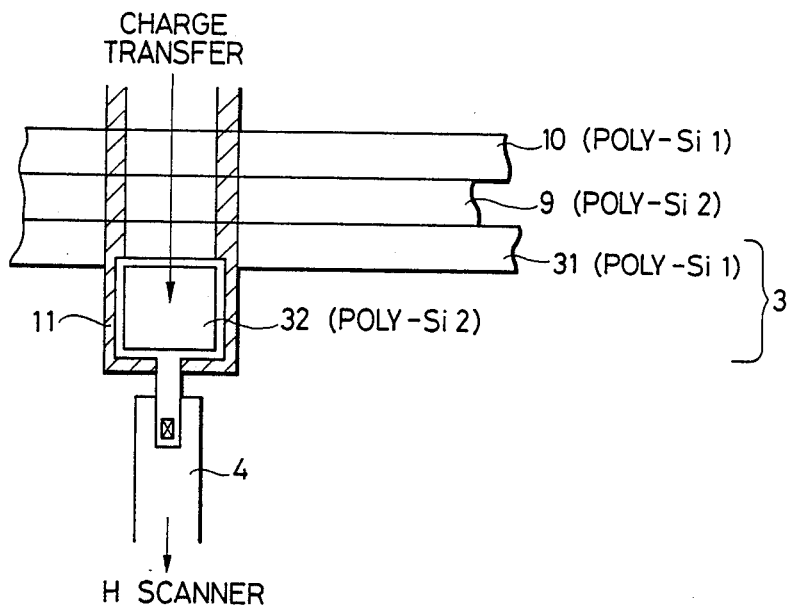
FIGS. 2A and 2B are enlarged views of the image sensors respectively illustrated in FIGS. 1A and 1B.

FIG. 2A illustrates an enlarged region near the MOS electrode pair 3. The MOS electrode pair 3 is arranged on the output side of the vertical transfer part 2 and is gated through a common gate electrode 9. In addition, a common transfer electrode 10 gates the vertical transfer part 2 and each picture element column (signal channel) is isolated from each other by an insulating channel stopper 11.

The image sensor thus constituted focuses an image of an object at the photosensing part 1 when it is exposed and obtains charges corresponding to the brightness of the object. The signal charges accumulated in the photosensing part 1 are transferred from all picture elements at a single time to the vertical transfer CCDs 2a at a part of the vertical blanking period.

The vertical transfer CCDs 2a are so constituted like the conventional ones that they are shielded from the incident light in order to prevent mixture of the light during vertical transfer. The signal charges transferred to the vertical transfer CCDs 2a are sequentially transferred in parallel as one horizontal scanning line. The parallel transfer occurs in the vertical direction at a rate of standard scanning of a television system up to the MOS electrode pair 3. In this case, the gate electrode 9 is made conductive and all the electrodes 31 and 32 of the MOS electrode pair 3 are raised to the H (high) level, as illustrated in the timing chart of FIG. 3, thus accumulating signal charges in the potential well under the common electrode 31. Thereafter, when the gate electrode 9 is cut off, simultaneously only the common electrode 31 accumulating signal charges is set to the L (low) level. Thereby, the signal charges are transferred to the area under the other separately controlled electrodes 32. When under this condition these separately controlled electrodes 32 are sequentially scanned by the horizontal shift register 5 to have a large negative pulse followed by a neutral bias, the signal charges are injected into the substrate 6 beneath these electrodes 32. Corresponding detected current is extracted as a video signal in one horizontal direction through the reading circuit 8. Upon completion of the one horizontal scanning line (1H period), the electrodes 31 and 32 of the MOS electrode pair 3 are all set again to the H level, allowing the parallel transfer of the next horizontal line of signal charges from the vertical transfer CCDs. Thereafter, after the signal charges are transferred to the area under the separately controlled electrode 32, like the preceding case, these charges are injected into the substrate 6 and are read.

Figure 3:
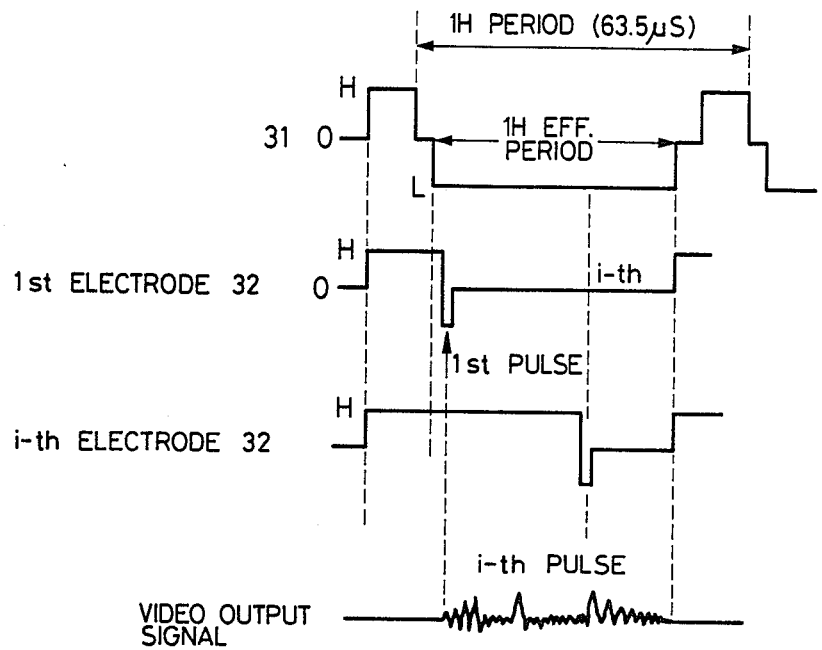
FIG. 3 illustrates signal waveforms for explaining operations of the first and second embodiments.

FIG. 3 illustrates the driving waveforms and video output signal at each electrode for realizing the reading steps mentioned above. During one horizontal scanning period 1H, the separately controlled electrodes 32 of the MOS electrode pair 3 (only two of which are illustrated) driven sequentially by the scanning signal and thereby charges are output.

In above embodiment, an ordinary horizontal shift register 5 which is continuously scanned is used but it is also possible to read in a random sequence with an adequate decoder.

As described previously, according to an image sensor of the present invention, sensitivity for blue light can be improved and a degree of freedom of a color picture pickup device design can also be enhanced because the photosensing part is formed like the ordinary ILCCD and polysilicon electrodes are provided on the photosensing part 1 unlike the CID of prior art. Moreover, since the photosensing party 1 is also formed by the ILCCD, each picture element column is separated by the channel stopper and charges are injected to the substrate after being transferred to the separately controlled electrode 32 through the commonly controlled gate electrode 31, vertical crosstalk is not generated. In addition, since the horizontal transfer CCD is not used, the drive frequency and transfer efficiency limit by the horizontal transfer part can be alleviated, the picture elements can be integrated at a high density in the horizontal direction and thereby the horizontal resolution can be improved.

The second embodiment of the present invention wil then be explained.

Figure 1B:
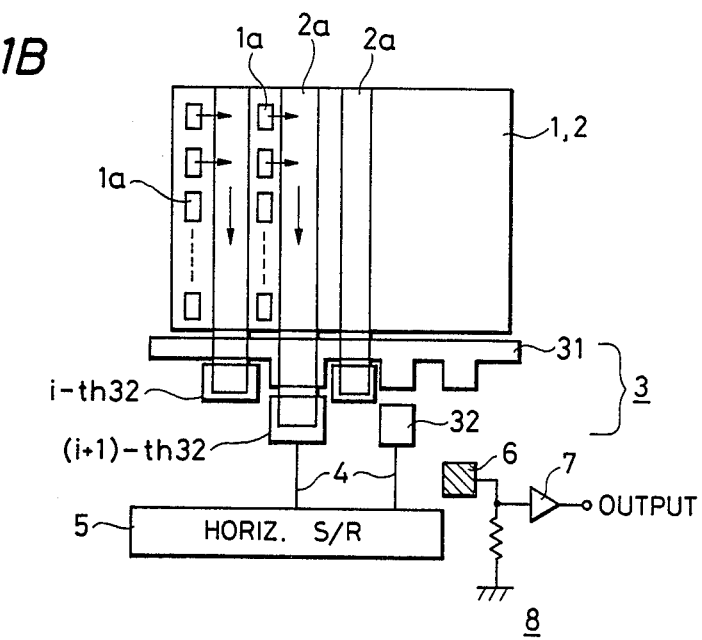
Figure 2B:
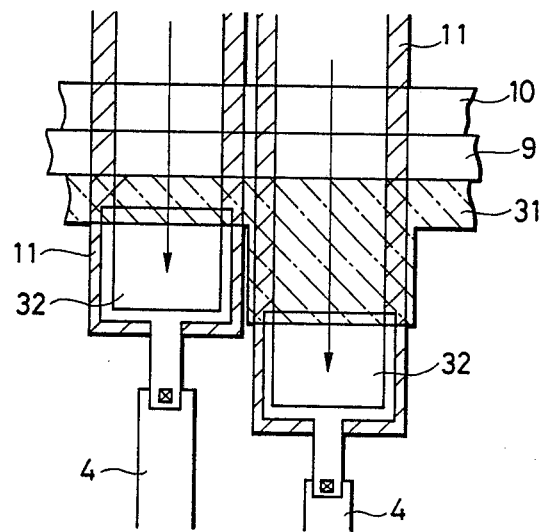

The second embodiment is illustrated in FIGS. 1B and 2B with almost the same constitution as the first embodiment, except for only the following difference.

Namely, the first or commonly controlled electrode 31 is provided in the shape of plane formed almost like a teeth, while the second or separately controlled electrodes 32 arranged in the vicinity of the first electrode 31 have a staggered arrangement where adjacent electrodes 32 are displaced corresponding to the shape of the first electrode 3.

FIG. 2B illustrates enlarged view of the region near the MOS electrode pair 3.

Operations of the second embodiment is similar to that of the first embodiment, but such operations are characterized as follow, based on the structural difference described above. Namely, the second, separately controlled electrodes 32 are sequentially scanned by the horizontal shift register 5 and each is set to the L level, injecting the charges into the substrate 6. In this case, the second electrode 32 does not generate so-called the horizontal adjacent crosstalk wherein charges flow into the adjacent electrode and the charges are injected to the substrate 6 since the adjacent second electrode 32 is staggered.

In above embodiment, a CID is combined with an ILCCD but it is also possible to employ the combination with FTCCD (Frame Transfer CCD) or CPD (Charge Priming Device).

As described previously, the image sensor of the present invention is usable with high density picture elements in the horizontal direction, namely, it attains a high quality picture by employing a CID for reading signal charges in the horizontal direction. Moreover, it should be noted that since the one common electrode of the electrode pair forming the CID is alternately arranged in the staggered configuration, diversion of signal charges to the adjacent electrode can be prevented and thereby horizontal resolution is not lowered by the horizontal crosstalk. Further, when a color filter is arranged on the photosensing part, from the same point of view, mixing of color with the adjacent element in the horizontal direction is not generated and thereby good color reproducibility can be attained.

Figure 4:
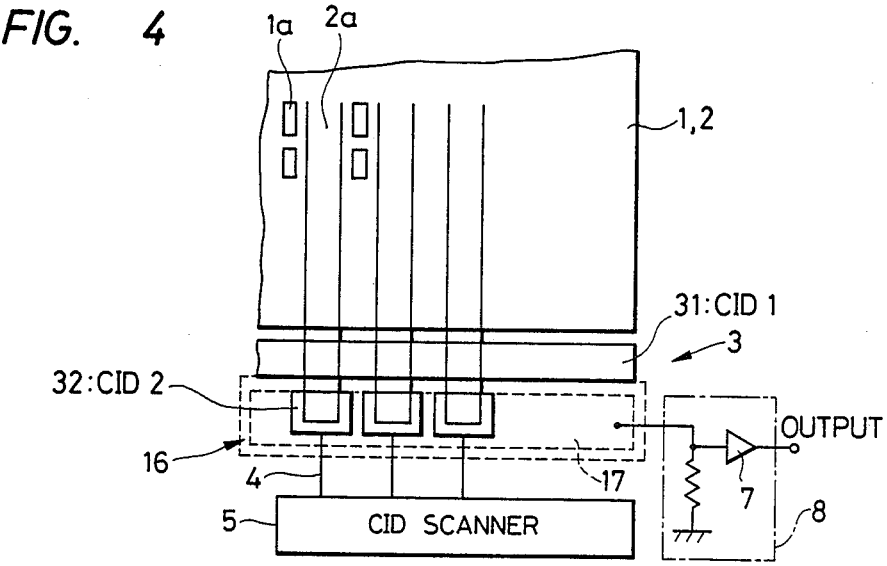
FIG. 4 is a pictorial presentation for explaining an image sensor based on the third embodiment of the present invention.

The third embodiment of the image sensor of the present invention will be explained in detail with reference to FIG. 4.

An isolation diffusion region 16 (indicated by a broken line) is provided in the substrate 6 under the second electrodes 32 in such a manner as to surround the second electrodes 32. This isolation diffusion layer 16 is formed by the thermal diffusion of boron (at about 1,200° C.), for example, to the N-type substrate which is patterned by the mask material. In other words, it may also be formed by well known LOCOS method proposed as the element isolation method. A substrate region 17 surrounded by the isolation region 16 is connected with the read circuit 8 including an amplifier 7. Although not illustrated, each picture element column (signal channel) is isolated by the channel stopper 11 as illustrated in FIGS. 2A and 2B.

The signal charges transferred to the vertical transfer CCD sequentially transfers the signal for as much as one scanning line to the lower side in parallel in the vertical direction at the rate of the standard scanning of the television system and then transfers it to the MOS electrode pair 3.

In this case, both the first electrode 31 and the second electrode 32 of the MOS electrode pair 3 are set to the H level because a voltage is applied thereto and the signal charges are accumulated by the high voltage electrode, namely, in the potential well under the first electrode 31. Thereafter, when only the first electrode 31 accumulating the charges is set to the L level, signal charges are transferred at one time to the regions under the second electrode 32. If the second electrodes 32 are sequentially scanned by the horizontal shift register 5 and are then set to the L level under such condition, charges are injected into the substrate 6 and are then read through the amplifier 7. In this case, readout of charges from the substrate 6 is restricted only to the limited region of the substrate 6, namely to the region 17 surrounding the second electrodes 32 as defined by the isolation diffusion 16. Accordingly, noise read together with the signal charges is limited only to that generated within this region 17, thus improving the signal-to-noise ratio.

In this embodiment, the isolation diffusion region 16 is provided in the region surrounding the second electrodes 32 but it may also be provided at the periphery of the MOS electrode pair 3 including the first electrodes 31. However, it is desirable to provide such isolation diffusion region 16 in such a manner as described in the embodiment in order to minimize the noise source for improving the signal-to-noise ratio.

As described previously, the image sensor of the present invention has improved the signal-to-noise ratio by minimizing the region in which the signal is read, namely the region of substrate to which charges are injected into CID where the MOS electrode pair is arranged. In addition, a highly sensitive sensor has been realized by constructing the photosensing part and the vertical transfer part with ordinary CCD's. Moreover, the drive control can be realized even when the number of picture elements in the horizontal direction increases and therefore high quality picture with high picture element density can also be achieved by employing CID for the charge transfer in the horizontal direction.

What is claimed is:

1. An image sensor, comprising:
    a plurality of photosensing elements arranged in a plurality of columns;
    a plurality of vertical transfer CCDs arranged along said columns between said columns for receiving imaging signals from said photosensing elements and shifting said imaging signals to first positions near respective ends of a plurality of signal channels of said vertical transfer CCDs;
    a first MOS gate electrode commonly applied to said signal channels at said first position for gating in parallel said imaging signals to second positions nearer said respective ends;
    a plurality of second MOS gate electrodes respectively applied at said second positions for injecting said imaging signals to a substrate underlying said second MOS gate electrodes;
    means for separately controlling said second MOS gate electrodes; and
    means for sensing charge injected into said substrate.

2. An image sensor as recited in claim 1, wherein said first MOS gate electrode is formed with an undulatory edge facing away from said photosensing elements with a pitch of twice a pitch of said signal channels and wherein said second MOS gate electrodes are formed in a staggered arrangement near said undulatory edge.

3. An image sensor as recited in claim 1, further comprising an isolation region surrounding at least a part of said image channels including areas surrounding said second electrodes.

4. An image sensor as recited in claim 3, wherein said isolation region surrounds an area of said substrate beneath all of said second electrodes and said sensing means is connected to said surrounded area.

5. An image sensor as recited in claim 2, further comprising an isolation region surrounding at least a part of said image channels including areas surrounding said second electrodes.

6. An image sensor as recited in claim 5, wherein said isolation region surrounds an area of said substrate beneath all of said second electrodes and said sensing means is connected to said surrounded area.

* * * * *